United States Patent
Wang et al.

(10) Patent No.: US 12,047,776 B2
(45) Date of Patent: *Jul. 23, 2024

(54) METHOD AND DEVICE FOR AUTHENTICATING UE

(71) Applicant: Samsung Electronics Co., Ltd., Suwon-si (KR)

(72) Inventors: Hong Wang, Beijing (CN); Lixiang Xu, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,023

(22) Filed: Jun. 30, 2023

(65) Prior Publication Data

US 2023/0354024 A1 Nov. 2, 2023

Related U.S. Application Data

(63) Continuation of application No. 17/646,092, filed on Dec. 27, 2021, now Pat. No. 11,696,132, which is a
(Continued)

(30) Foreign Application Priority Data

Apr. 4, 2018 (CN) .......................... 201810299131.2

(51) Int. Cl.
*H04W 12/06* (2021.01)
*H04W 12/03* (2021.01)
(Continued)

(52) U.S. Cl.
CPC .......... *H04W 12/06* (2013.01); *H04W 12/03* (2021.01); *H04W 36/0033* (2013.01); *H04W 76/19* (2018.02); *H04W 76/27* (2018.02)

(58) Field of Classification Search
CPC ..... H04W 12/06; H04W 76/19; H04W 76/27; H04W 12/03; H04W 36/0033
See application file for complete search history.

(56) References Cited

U.S. PATENT DOCUMENTS

| 11,240,665 B2 | 2/2022 | Wang |
| 2009/0170515 A1 | 7/2009 | Kato et al. |

(Continued)

FOREIGN PATENT DOCUMENTS

| CN | 101779391 A | | 7/2010 |
| CN | 101848536 A | * | 9/2010 |

(Continued)

OTHER PUBLICATIONS

International Search Report and Written Opinion of the International Searching Authority in connection with International Application No. PCT/KR2019/003952 dated Jul. 11, 2019, 12 pages.
(Continued)

*Primary Examiner* — Dung Hong (57) ABSTRACT

The present invention provides a method of how the serving base station notifies UE of the encryption information used in the re-establishment process, how the serving base station finds the UE context information and authenticates the UE, in the 5G architecture. By means of the method of the present invention, the message between the RRC message and the base station can be optimized, the UE is correctly authenticated, and the re-establishment failure is avoided.

12 Claims, 7 Drawing Sheets

Related U.S. Application Data continuation of application No. 17/045,440, filed as application No. PCT/KR2019/003952 on Apr. 3, 2019, now Pat. No. 11,240,665.

(51) Int. Cl.
*H04W 36/00* (2009.01)
*H04W 76/19* (2018.01)
*H04W 76/27* (2018.01)

(56) References Cited

U.S. PATENT DOCUMENTS

| | | | |
|---|---|---|---|
| 2015/0065092 A1 | 3/2015 | Blom et al. | |
| 2016/0014650 A1 | 1/2016 | Laganier et al. | |
| 2016/0183091 A1* | 6/2016 | Norrman | H04L 63/08 |
| | | | 455/411 |
| 2017/0171784 A1* | 6/2017 | Mitsui | H04W 76/20 |
| 2017/0188403 A1 | 6/2017 | Jung et al. | |
| 2018/0035484 A1 | 2/2018 | Kim et al. | |
| 2018/0160436 A1* | 6/2018 | Park | H04W 76/14 |
| 2018/0160467 A1* | 6/2018 | Quan | H04W 12/10 |
| 2018/0234890 A1 | 8/2018 | Shih et al. | |
| 2018/0302944 A1 | 10/2018 | Chang et al. | |
| 2019/0191483 A1 | 6/2019 | Ryoo et al. | |
| 2019/0357109 A1 | 11/2019 | Hong et al. | |
| 2019/0387568 A1* | 12/2019 | Teyeb | H04W 76/30 |
| 2020/0323011 A1* | 10/2020 | Lehtovirta | H04W 12/0471 |
| 2020/0337107 A1 | 10/2020 | Mildh et al. | |
| 2020/0351723 A1* | 11/2020 | Kim | H04W 36/08 |
| 2021/0126747 A1 | 4/2021 | Kim et al. | |
| 2021/0204351 A1 | 7/2021 | Rayavarapu et al. | |
| 2021/0337429 A1 | 10/2021 | Fischer | |

FOREIGN PATENT DOCUMENTS

| | | | | |
|---|---|---|---|---|
| CN | 101848536 A | | 9/2010 | |
| CN | 102143539 A | * | 8/2011 | |
| CN | 102143539 A | | 8/2011 | |
| CN | 102348191 A | | 2/2012 | |
| CN | 103782628 A | | 5/2014 | |
| CN | 103858512 A | | 6/2014 | |
| WO | 2016013329 A1 | | 1/2016 | |
| WO | WO-2016013329 A1 | * | 1/2016 | ............ H04W 12/06 |
| WO | 2016140403 A1 | | 9/2016 | |
| WO | 2017020241 A1 | | 2/2017 | |
| WO | 2017085621 A1 | | 5/2017 | |
| WO | 2017107073 A1 | | 6/2017 | |
| WO | 2017122588 A1 | | 7/2017 | |
| WO | 2017171466 A1 | | 10/2017 | |
| WO | 2018014154 A1 | | 1/2018 | |
| WO | 2018031345 A1 | | 2/2018 | |

OTHER PUBLICATIONS

Supplementary European Search Report dated May 3, 2021 in connection with European Patent Application No. 19 78 1516, 11 pages.
CATT, "RRC connection re-establishment and resume procedures in NR", 3GPP TSG-RAN WG2 #101, Feb. 26-Mar. 2, 2018, R2-1801827, 7 pages.
Intel Corporation, "Security of RRC Connection re-establishment of NB-IOT for CP Solution", 3GPP TSG SA WG3 (Security) Meeting #86, Feb. 6-10, 2017, S3-170162, 6 pages.
Office Action dated Nov. 2, 2022 in connection with Chinese Patent Application No. 201810299131.2, 29 pages.
European Patent Office, "Communication under Rule 71(3) EPC—Intention to grant," dated Mar. 20, 2023, in connection with European Patent Application No. 19 781 516.0, 40 pages.
China National Intellectual Property Administration, "The Second Office Action," issued Apr. 21, 2023, in connection with Chinese Patent Application No. 2018102991312, 16 pages.
Notice of Third Review Opinion dated Jul. 17, 2023, in connection with Chinese Patent Application No. 201810299131.2, 15 pages.
Ericsson, "RRC re-establishment for CP NB-IoT", S3-170256, 3GPP TSG-SA3 Meeting #86, Sophia Antipolis, France, Feb. 6-10, 2017, 8 pages.
European Search Report dated Oct. 27, 2023, in connection with European Patent Application No. 23182128.1, 11 pages.
Office Action dated Oct. 19, 2023, in connection with Chinese Patent Application No. 201810299131.2, 17 pages.
Ericsson, "Security for RRC Connection Suspend and Resume," 3GPP TSG-SA WG3 Meeting #83, S3-160588 (revision of S3-16abcd), San Jose Del Cabo, Mexico, May 2016, 3 pages.
Notice of Allowance issued Mar. 29, 2024, in connection with Chinese Patent Application No. 201810299131.2, 8 pages.
Qualcomm Inc et al., "Introduction of support for MAC PDU containing UE contention resolution identity MAC control element without RRC response message in NB-Iot," 3GPP TSG-RAN WG2 Meeting #101 R2-1804131 Athens, Greece, Feb.-Mar. 2, 2018, 8 pages.

* cited by examiner

METHOD AND DEVICE FOR AUTHENTICATING UE

CROSS-REFERENCE TO RELATED APPLICATIONS

This application is a continuation of application Ser. No. 17/646,092 filed Dec. 27, 2021, now U.S. Pat. No. 11,696,132 issued Jul. 4, 2023, which is a continuation of application Ser. No. 17/045,440 filed Oct. 5, 2020, now U.S. Pat. No. 11,240,665 issued Feb. 1, 2022, which is a 371 National Stage of International Application No. PCT/KR2019/003952, filed Apr. 3, 2019, which claims priority to Chinese Patent Application No. 201810299131.2, filed Apr. 4, 2018, the disclosures of which are herein incorporated by reference in their entirety.

BACKGROUND

1. Field

The present invention relates to the wireless communication technology, and in particular to a method and device for authenticating UE, specifically, a method of how to configure the encryption information used by the UE, authenticate the UE, and get the correct UE context, under the new architecture.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The present invention provides a method and device for authenticating user equipment (UE). Under the 5G architecture, by the process between the RRC procedure and the base station of the present invention, the UE can obtain the correct encryption information, as well the base station can obtain the correct UE context information, during the re-establishment and/or process, to ensure the success of the re-establishment and/or resume process.

DETAILED DESCRIPTION

The present invention provides a method for authenticating user equipment (UE), comprising: receiving, by the UE, a handover command or a Radio Resource Control (RRC) message transmitted by a first base station; transmitting, by the UE, an RRC re-establishment message to a second base station, wherein the RRC re-establishment message carries the authentication token information.

Alternatively, the handover command or the RRC message further carries the encryption information used when the UE re-establishes the RRC connection.

Alternatively, the encryption information comprises an indication of an encryption algorithm and/or a change pointer NCC.

The present invention also provides a method for authenticating user equipment (UE), comprising: transmitting, by a first base station, a handover command or a Radio Resource Control (RRC) message to the UE; receiving, by the first base station, a message for requesting UE context information transmitted by a second base station, wherein the message carries the authentication token information and authentication indication information; authenticating UE, by the first base station, according to the authentication token information and authentication indication information; and transmitting, by the first base station, the UE context information to the second base station, when the UE is successfully authenticated by the first base station.

Alternatively, the message for requesting UE context information carries identifier information of UE.

Alternatively, the handover command or the RRC message further carries the encryption information used when the UE re-establishes the RRC connection.

Alternatively, the encryption information comprises an indication of an encryption algorithm and/or a change pointer NCC.

Alternatively, the authentication indication information is used to indicate an authentication method used by the first base station.

Alternatively, the authentication indication information is indicated by different identifier information of UE.

The present invention also provides a method for authenticating user equipment (UE), comprising: receiving, by the second base station, an RRC re-establishment message transmitted by the UE, wherein the RRC re-establishment message carries authentication token information; transmitting, by the second base station, a message for requesting UE context information to a first base station, wherein the message carries the authentication token information and authentication indication information; receiving, by the second base station, the UE context information from the first base station.

Alternatively, the message for requesting the UE context information carries identifier information of the UE.

Alternatively, the authentication indication information is used to indicate an authentication method used by the first base station.

Alternatively, the authentication indication information is indicated by different identifier information of UE.

The present invention further provides a user equipment, comprising: a first receiving module, configured to receive a handover command or a Radio Resource Control (RRC) message transmitted by a first base station; and a first transmitting module, configured to transmit an RRC re-establishment message to a second base station, wherein the RRC re-establishment message carries the authentication token information.

The present invention still provides a first base station device, comprising:

a second transmitting module, configured to transmit a handover command or a Radio Resource Control (RRC) message to the user equipment (UE); a second receiving module, configured to receive a message for requesting UE context information transmitted by a second base station, wherein the message carries the authentication token information and authentication indication information; and an authenticating module, configured to authenticate UE according to the authentication token information and authentication indication information; the second transmitting module is further configured to transmit the UE context information to the second base station, when the UE is successfully authenticated by the first base station.

The present invention still provides a second base station device, comprising: a third receiving module, configured to receive an RRC re-establishment message transmitted by the UE, wherein the RRC re-establishment message carries authentication token information; and a third transmitting module, configured to transmit a message for requesting the UE context information to a first base station, wherein the message carries the authentication token information and authentication indication information; and a third receiving module is further configured to receive the UE context information from the first base station.

The present invention still provides a user equipment, comprising: a memory and a processor, wherein the memory stores computer executable instructions thereon, when the instructions are executed by the processor, the processor executes the above methods.

The present invention still provides a first base station device, comprising: a memory and a processor, wherein the memory stores computer executable instructions thereon, when the instructions are executed by the processor, the processor executes the above methods.

The present invention still provides a second base station device, comprising: a memory and a processor, wherein the memory stores computer executable instructions thereon, when the instructions are executed by the processor, the processor executes the above methods.

The present invention still provides a method for authenticating user equipment (UE), comprising: transmitting, by a first base station, a handover command or a Radio Resource Control (RRC) message to the UE; receiving the handover command or the Radio Resource Control (RRC) message transmitted by the first base station and transmitting an RRC re-establishment message to a second base station, by the UE, wherein the RRC re-establishment message carries the authentication token information; receiving the RRC re-establishment message transmitted by the UE and transmitting a message for requesting UE context information to the first base station, by the second base station, wherein the message for requesting the UE context information carries the authentication token information and authentication indication information; receiving the message for requesting the UE context information transmitted by the second base station and transmitting the UE context information to the second base station when the UE is successfully authenticated, by the first base station, wherein the authentication token information and authentication indication information carried in the message for requesting the UE context information are used to authenticate the UE; and receiving, by the second base station, the UE context information from the first base station.

In order to make the objects, technical solutions and advantages of the present application more apparent, hereafter, the present application will be further described in detail with reference to the accompanying drawings. It should be noted that the following description is for illustrative purposes only and is not intended to limit the disclosure. In the following description, numerous specific details are set forth in order to provide a thorough understanding to the present disclosure. However, it will be apparent to those skilled in the art that these specific details are not necessary to implement the present disclosure. In other examples, well-known circuits, materials, or methods have not been specifically described in order to avoid obscuring the present disclosure.

Throughout the specification, references to "one embodiment", "an embodiment", "one example" or "an example" means that the particular features, structures, or characteristics described in combination with this embodiment or example are included in at least one embodiment of the present disclosure. Therefore, throughout the specification, the expressions of the phrase "in one embodiment", "in an embodiment", "in one example" or "in an example" are not necessary to refer to the same embodiment or example. In addition, the particular features, structures, or characteristics may be combined in one or more embodiments or examples in any suitable combination and/or sub-combination. In addition, it should be understood by those skilled in the art, the drawings herein are provided for the purpose of illustration, and the drawings are not necessarily to scale. The term "and/or" used herein includes any and all combinations of one or more of the associated listed items.

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

Figure 1:
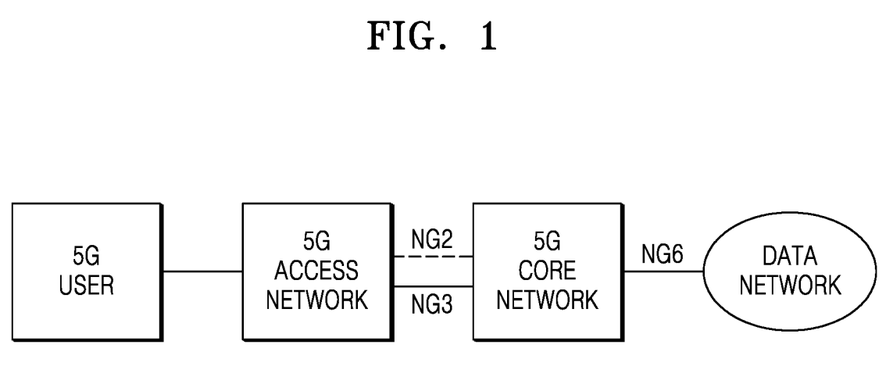
FIG. 1 is a diagram of 5G system architecture.

5G refers to the fifth generation of mobile communication technology. Unlike the previous four generations, 5G is not a single wireless technology, but a convergence of existing wireless communication technologies. At present, the peak rate of LTE can reach 100 Mbps, and the peak rate of 5G will reach 10 Gbps, which is 100 times higher than that of 4G. The existing 4G network has limited processing capacity and cannot support some high-definition video, high-quality voice, augmented reality, virtual reality and other services. 5G will introduce more advanced technologies to meet the growing demand for mobile service traffic by using higher spectrum efficiency, more spectrum resources and denser cells, to solve the problems faced by 4G networks, and to build a network community with high-speed transmission rate and high capacity, low latency, high reliability, and excellent user experience. As shown in FIG. 1, the 5G architecture includes a 5G access network and a 5G core network. The UE communicates with the data network through the access network and core network.

In 5G, the states of the UE include an RRC connection state, an RRC inactive state, and an idle state. If the UE in the RRC connection state disconnects with the network node, that is, the radio link fails, the UE reselects a serving cell to access, and the re-access process is called an RRC re-establishment process. The previous base station for serving UE is referred to as an old serving base station, and the base station where the reselected serving cell is located is referred to as a new serving base station. A base station may allow the UE to enter the RRC inactive state from the RRC connection state (for convenience of description, this base station may be referred to as an old serving base station, which is also the previous serving base station of the UE), and the UE in the RRC inactive state may reselect one serving cell and initiate a resume process (the base station where the cell is located is referred to as a new serving base station). The new serving base station receives the re-establishment request, or receives the resume request, the base station finds the old serving base station according to the information reported by the UE, and the old serving base station transmits the UE context information to the new base station, so that the re-establishment process or resume process will succeed. But the following problems need to be solved:

1. How the old serving base station finds the UE context information and authenticates whether the UE is legal;
2. How the old serving base station notifies the UE of the encryption information used in the re-establishment process.

In order to solve the above problems, it is necessary to define a new process between a RRC procedure and a base station. The present invention proposes a method of how the UE obtains the correct encryption information, how the base station obtains the correct context information of UE during the re-establishment and/or resume process, to ensure that the re-establishment and/or resume process can be successful.

Figure 2:
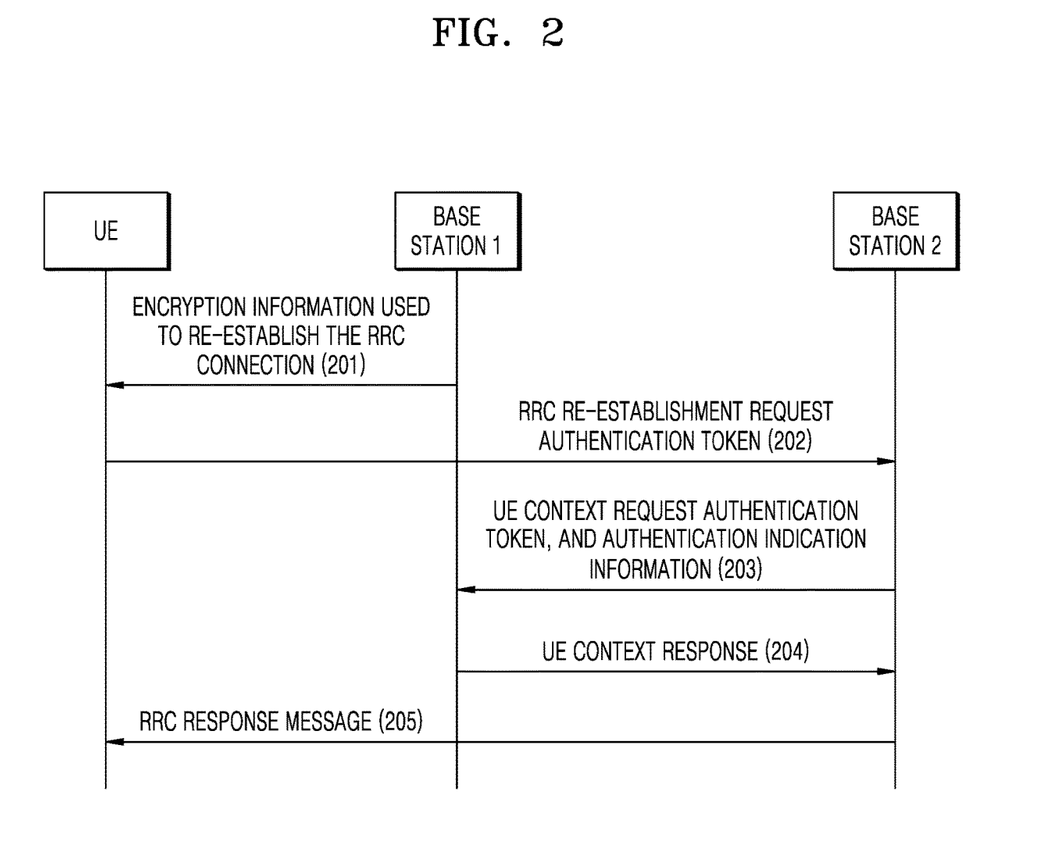
FIG. 2 is a schematic diagram of a method of the present invention.

FIG. 2 describes a schematic diagram of a method of the present invention.

A base station 1 is a previous base station where the current serving cell is located, a base station 2 is the base station where the user equipment (UE) performs Radio Resource Control (RRC) re-establishment, and the base station 2 may be referred as a new base station or a target base station, and the base station 1 may be referred as an old base station or a source base station.

Step 201: The base station 1 transmits an RRC message to the UE, wherein the message carries the encryption information used to re-establish the RRC connection when the UE fails. The encryption information includes the indication of the encryption algorithm and/or the change pointer NCC (NextHopChangingCount, referred to as NCC), and further includes the identifier of the UE context allocated to the UE by the base station 1. The identifier is unique for the base station 1, by which the base station 1 can find the information of the serving cell corresponding to the UE and the context of the UE. The base station 1 transmits the RRC message which may be a handover command message or a new RRC message, when the UE performs a handover to the base station 1.

Step 202: The UE transmits an RRC re-establishment request message to the base station 2, where the message carries the identifier information of the UE obtained by UE from the base station 1, and includes the authentication token information calculated by the UE.

Step 203: The base station 2 transmits a UE context request message to the base station 1. The message carries the identifier information of the UE, the authentication token information, and the cell identifier of the target cell, for example, E-UTRAN Cell Global Identifier (ECGI).

Step 204: The base station 1 authenticates the UE. If the UE is legal, the base station 1 transmits a UE context response message, which carries the UE context information, to the base station 2.

Step 205: The base station 2 transmits an RRC response message to the UE to determine that the RRC re-establishment is successful.

Embodiment 1

Figure 3:
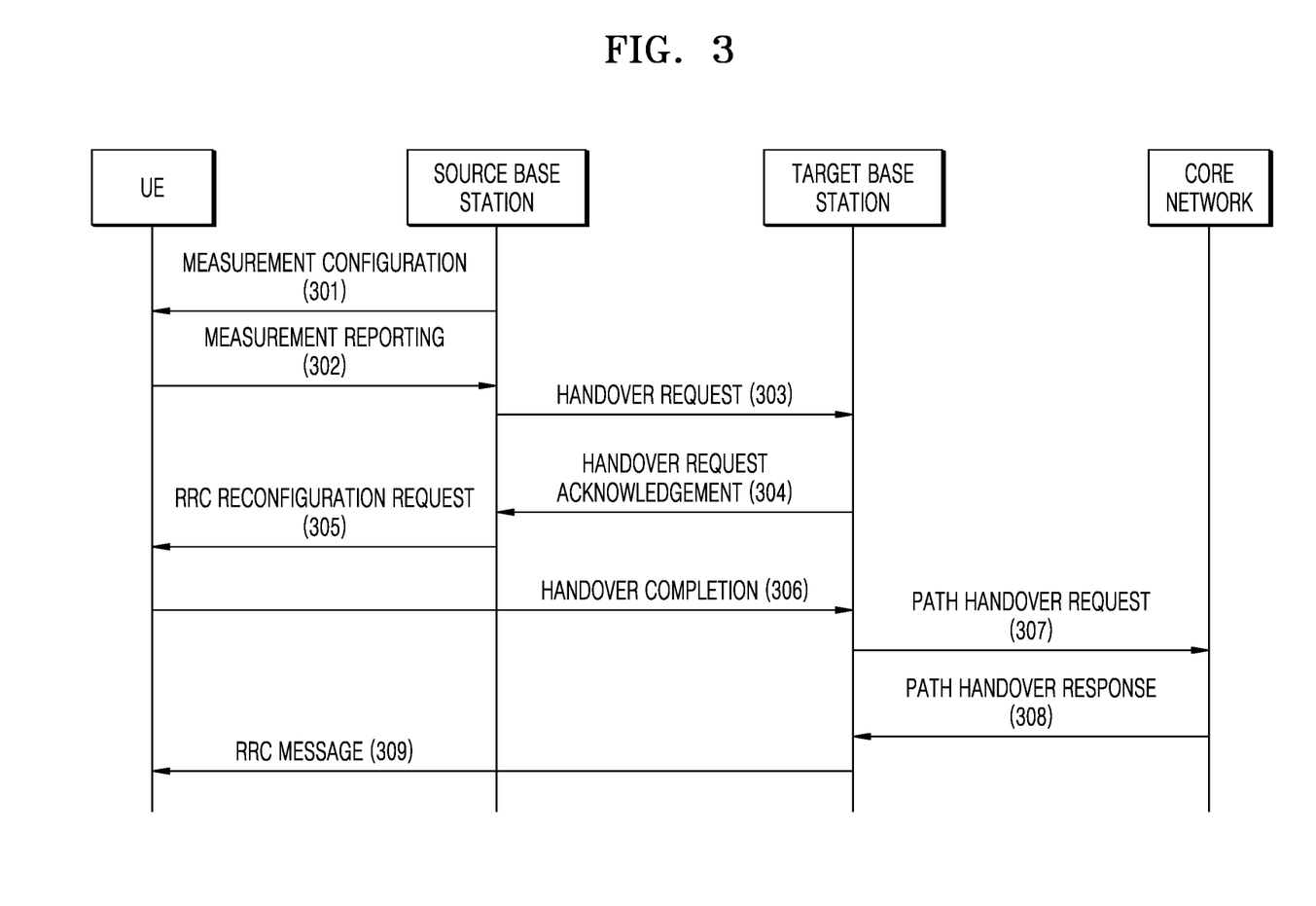
FIG. 3 is a schematic diagram of Embodiment 1 of the present invention.

FIG. 3 describes an Embodiment 1 of the method of the present invention. The base station where the source cell is located is referred to as the source base station, and the base station where the target cell is located is referred to as the target base station. The source base station and the target base station may be eNBs connected to the 5G core network, gNBs, or nodes supporting non-3GPP access technology. The Embodiment 1 describes that the source base station initiates the Xn handover process, and the source base station or the target base station generates the encryption information used in the new cell, if the radio link fails after the UE performs the handover to the target base station. If the encryption information of the target base station is called new encryption information, and then the encryption information later used in the new cell is called the encryption information of the next hop. The source base station or the target base station transmits the encryption information of the next hop to the UE through an RRC message.

Step 301: The source base station configures a mechanism for the UE to perform measurement and measurement reporting. The UE measures the signal quality of the surrounding cells according to the configuration of the network, and reports the information of the cell that meets the reporting requirements to the network.

Step 302: The UE reports the measurement result to the source base station. The measurement result includes the physical layer identifier of the cell and/or the cell unique identifier, and the measurement result of the cell, such as Reference Signal Received Power (RSRP), and Reference Signal Received Quality (RSRQ).

Step 303, the source base station decides to initiate the Xn handover process. The source base station transmits a handover request message to the target base station. The message carries at least one or more of the following information:

The cell identifier of the target cell, for example, the cell unique identifier ECGI, or the physical layer identifier of the target cell, for example, Physical Cell Identifier (PCI);

New encryption information; the new encryption information includes the key KgNB* and/or the change pointer NCC. This key is used on the target base station, and is calculated by the source base station and transmitted to the target base station.

The Cell-Radio Network Temporary Identifier (C-RNTI) of the UE configured by the source cell;

Capability information of the UE.

The message also includes the encryption information of the next hop, and the encryption information of the next hop can be used for the next handover or the next RRC re-establishment after the handover to the target base station. The encryption information includes an indication of the encryption algorithm and/or change pointer NCC, the indication of the encryption algorithm indicates which encryption algorithm the UE uses in the next base station or the next cell, and the NCC indicates which change pointer NCC the UE uses in the next base station or the next cell.

Step 304: The base station where the target cell is located performs access control. If the target cell allows the handover of UE to the target cell, the target base station transmits a handover request acknowledgement message to the source base station. The handover request acknowledgement message carries a handover command to be transmitted to the UE, and the handover command is included in the message of step 304 through the RRC container. The handover command carries information required by the handover of UE to the target cell. The information may include at least one or more of the following information:

The identifier of the target cell, such as the physical layer identifier of the target cell (for example, PCI), or the cell unique identifier ECGI of the target cell;

The identifier of the target base station;

The frequency of the target cell;

Identifier C-RNTI of the UE allocated by the target cell;

Encryption information used by the target cell. The encryption information includes indication information of an algorithm used by the UE in the target cell, which indicates which encryption algorithm is used, and the encryption information also indicates a change pointer of next hop NCC;

The message may also include an identifier of the base station-UE context allocated by the target base station for the UE, for example, a Radio Network Temporary Identifier (I-RNTI). The identifier is unique under the base station, by which the base station can find the information of the serving cell corresponding to the UE and the context of the UE. For example, the identifier may include the identifier of the base station and the C-RNTI of the UE in the target base station, or part of the C-RNTI and part of the identifier of the base station. With this identifier, the base station and the context of the UE stored on the corresponding base station can be found. For convenience of description, an "access network identifier" is also used hereinafter to indicate the identifier of the base station-UE context.

The message also includes the encryption information of the next hop, and the encryption information of the next hop can be used for the next handover or the next RRC re-establishment after the handover to the target base station. The encryption information may be generated by the source cell and transmitted to the target cell by using the step 303, and transmitted to the UE by the target cell, or the encryption information may be generated by the target cell, and transmitted to the UE by the target cell. The encryption information includes the indication of the encryption algorithm and/or an NCC, where the indication of the encryption algorithm indicates which encryption algorithm the UE uses in the next base station or the next cell, where the NCC indicates which change pointer NCC the UE uses in the next base station or the next cell.

The resource configuration of the target cell

Step 305, The source base station transmits the RRC reconfiguration request message, which carries the handover command received in step 304, to the UE.

Step 306, UE synchronizes with the target cell, and UE transmits a handover completion message, which indicates that UE has reconfigured according to the handover command transmitted by the network, to the base station where the target cell is located.

Step 307, the target base station transmits the path handover request message to the core network. The path handover request message carries tunnel information carried on the target base station after handover, which includes the identifier of the target cell and the location identifier of the target cell, such as the identifier of the routing area.

Step 308, the core network transmits the path handover response message to the target base station. The path handover request message carries tunnel information carried on the core network after handover, and the encryption information configured for UE by the network, for example, the encryption information including one or more groups of NCC and NH, that is, a group of {NCC, NH} to be used later. Both NCC and NH are used to calculate the encryption key.

Step 309, the target base station transmits an RRC message to UE, which carries the following information:

Encryption information to be used later calculated by the target cell, which can be used for next handover or next RRC re-establishment after handover to the target base station. The encryption information includes the indication of the encryption algorithm and/or NCC, the indication of the encryption algorithm indicates which encryption algorithm the UE uses in the next base station or next cell, and NCC indicates which change pointer NCC the UE uses in the next base station or next cell. To be clear, it can include one or more groups of encryption information.

An identifier of the base station-UE context allocated for the UE by the target base station, for example, an I-RNTI. The identifier is unique under the base station, by which the base station can find the information of the serving cell corresponding to the UE and the context of the UE. For example, the identifier may include the identifier of the base station and the C-RNTI of the UE in the target base station, or part of the C-RNTI and part of the identifier of the base station. With this identifier, the base station and the context of the UE stored on the corresponding base station can be found. For convenience of description, an "access network identifier" is also used hereinafter to indicate the identifier of the base station-UE context.

It should be noted that each time UE moves to a new cell, the new cell and the source cell are on the same base station. The base station can also transmit the message of step 309 to update the change pointer NCC and/or encryption algorithm of the next hop used by UE.

Later, if the UE fails to transmit a radio link, the UE reselects the cell and transmits an RRC re-establishment request message in the new cell. The re-establishment request message includes the access network identifier of UE, which includes the authentication token (short Mac-I) calculated by UE, and the calculation method of authentication token is described in Embodiment 3. If the RRC re-establishment request message needs to be encrypted, UE calculates the key for encrypting RRC based on the encryption information used for the next hop transmitted by the base station in step 309. The new cell obtains the UE context information from the old base station by means of the method of Embodiment 3.

Embodiment 2

Figure 4:
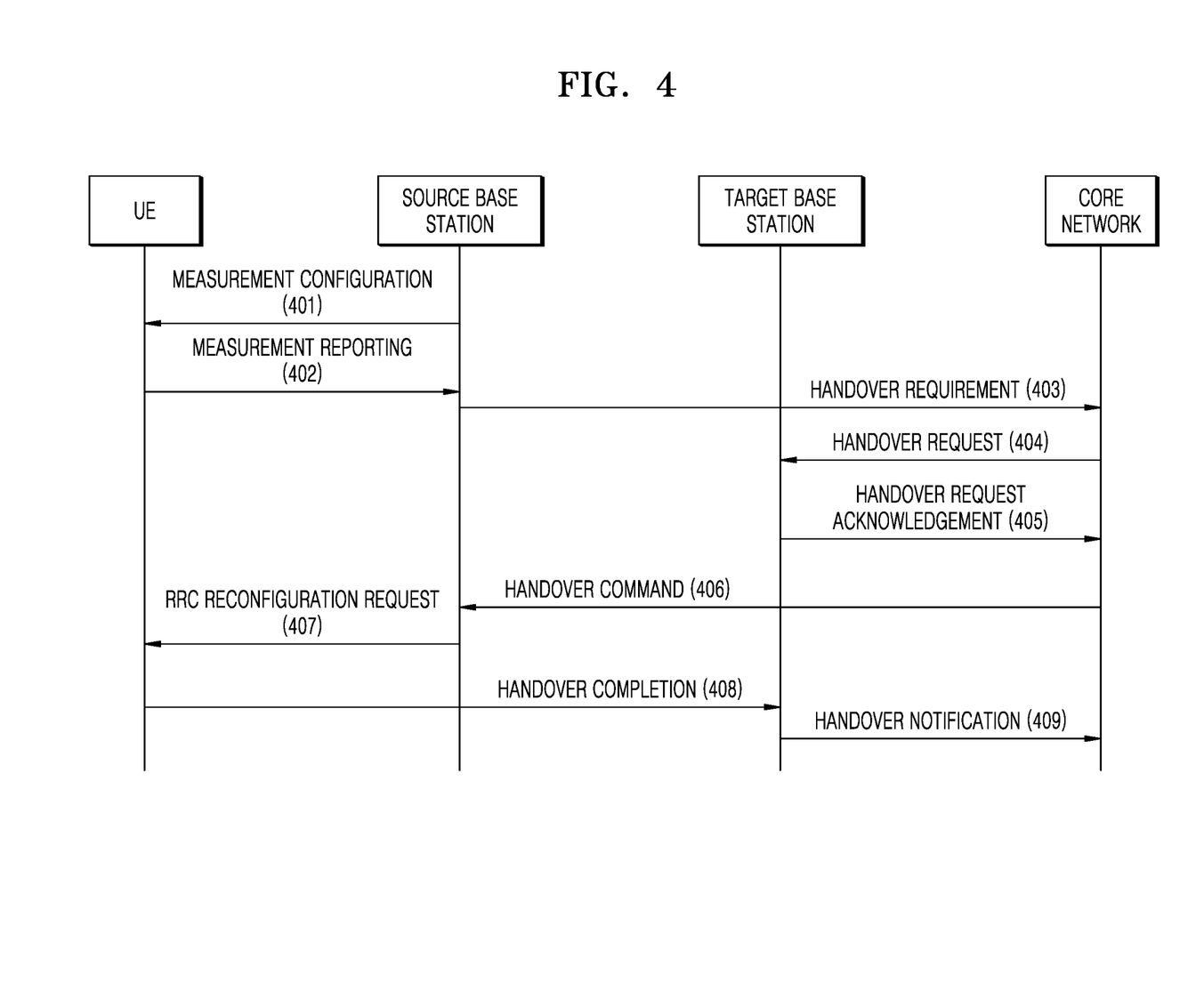
FIG. 4 is a schematic diagram of Embodiment 2 of the present invention.

FIG. 4 describes Embodiment 2 of the method of the present invention. The base station where the source cell is located is referred to as the source base station, and the base station where the target cell is located is referred to as the target base station. The source base station and the target base station may be eNBs connected to the 5G core network, gNBs, or nodes supporting non-3GPP access technology. The Embodiment 2 describes that the source base station initiates the SI handover process, and the source base station or the target base station generates the encryption information used in the new cell, if the radio link fails after the UE performs the handover to the target base station. If the information of the target base station is called new encryption information, and then the encryption information used in the new cell is called the encryption information of the next hop. The source base station or the target base station transmits the encryption information of the next hop to the UE through an RRC message.

Step 401, the source base station configures a mechanism for the UE to perform measurement and measurement reporting. The UE measures the signal quality of the surrounding cells according to the configuration of the network, and reports the information of the cell that meets the reporting requirements to the network.

Step 402, the UE reports the measurement result to the source base station. The measurement result includes the physical layer identifier of the cell and/or the cell unique identifier, and the measurement result of the cell, such as Reference Signal Received Power (RSRP), and Reference Signal Received Quality (RSRQ).

Step 403, the source base station decides to initiate the SI handover process. The source base station transmits a handover requirement message to the core network.

Step 404, the core network transmits the handover request message to the target base station. The message carries at least one or more of the following information:

The cell unique identifier of the target cell, for example, ECGI, or the physical layer identifier of the target cell, for example, PCI;

The carried information to be establish;

Encryption information allocated by the core network; the encryption information allocated by the core network includes one or more group of NCC and NH, that is, a group of {NCC, NH} to be used later. Both NCC and NH are used to calculate the encryption key.

Step 405, the base station where the target cell is located performs access control. If the target cell allows the handover of UE to the target cell, the target base station transmits a handover request acknowledgement message to the core network. The handover request acknowledgement message carries a handover command to be transmitted to the UE, and the handover command is included in the message of step 405 through the RRC container. The handover command carries information required by the handover of UE to the target cell. The information may include at least one or more of the following information;

The physical layer identifier of the target cell (for example, PCI), or the cell unique identifier ECGI of the target cell;

The identifier of the target base station;

The frequency of the target cell;

Identifier C-RNTI of the UE allocated by the target cell;

Encryption information used by the target cell. The encryption information includes indication information of an algorithm used by the UE in the target cell, which indicates which encryption algorithm is used, and the encryption information also indicates a change pointer of next hop (NextHopChangingCount, referred to as NCC); the encryption information also includes the encryption information of the hop after next, that is, it includes the NCC and/or encryption algorithm of the hop after next. The encryption information of the hop after next may be used for handover, or RRC re-establishment.

The message may also include an identifier of the base station-UE context allocated by the target base station for the UE, for example, an I-RNTI. The identifier is unique under the base station, by which the base station can find the information of the serving cell corresponding to the UE and the context of the UE. For example, the identifier may include the identifier of the base station and the C-RNTI of the UE in the target base station, or part of the C-RNTI and part of the identifier of the base station. With this identifier, the base station and the context of the UE stored on the corresponding base station can be found. For convenience of description, an "access network identifier" is also used hereinafter to indicate the identifier of the base station-UE context.

Encryption information to be used later calculated by the target cell, which can be used for next handover or next RRC re-establishment after handover to the target base station. The encryption information includes the indication of the encryption algorithm and/or NCC, the indication of the encryption algorithm indicates which encryption algorithm the UE uses in the next base station or next cell, and NCC indicates which change pointer NCC the UE uses in the next base station or next cell. To be clear, it can include one or more groups of encryption information.

Resource configuration of the target cell.

Step 406, the core network transmits messages to the source base station. The message carries the handover command to be transmitted to the UE.

Step 407, the source base station transmits an RRC reconfiguration request message, which carries the handover command received in step 406, to UE.

Step 408, UE synchronizes with the target cell, and UE transmits a handover completion message, which indicates that UE has reconfigured according to the handover command transmitted by the network, to the base station where the target cell is located.

Step 409, the target base station transmits the handover notification message to the core network. The message carries tunnel information carried on the target base station after handover, which includes the unique identifier of the target cell and the location identifier of the target cell, such as the identifier of the routing area.

Later, if the UE fails to transmit a radio link, the UE reselects the cell and transmits an RRC re-establishment request message in the new cell. The re-establishment request message includes the access network identifier of UE, which includes the authentication token (ShortMac-I) calculated by UE, and the calculation method of authentication token is described in Embodiment 3. If the RRC re-establishment request message needs to be encrypted, UE calculates the key for encrypting RRC based on the encryption information used for the next hop transmitted by the base station in step 407, and transmits the RRC message to the new cell. The new cell obtains the UE context information from the old base station by means of the method of Embodiment 3.

Embodiment 3

Figure 5:
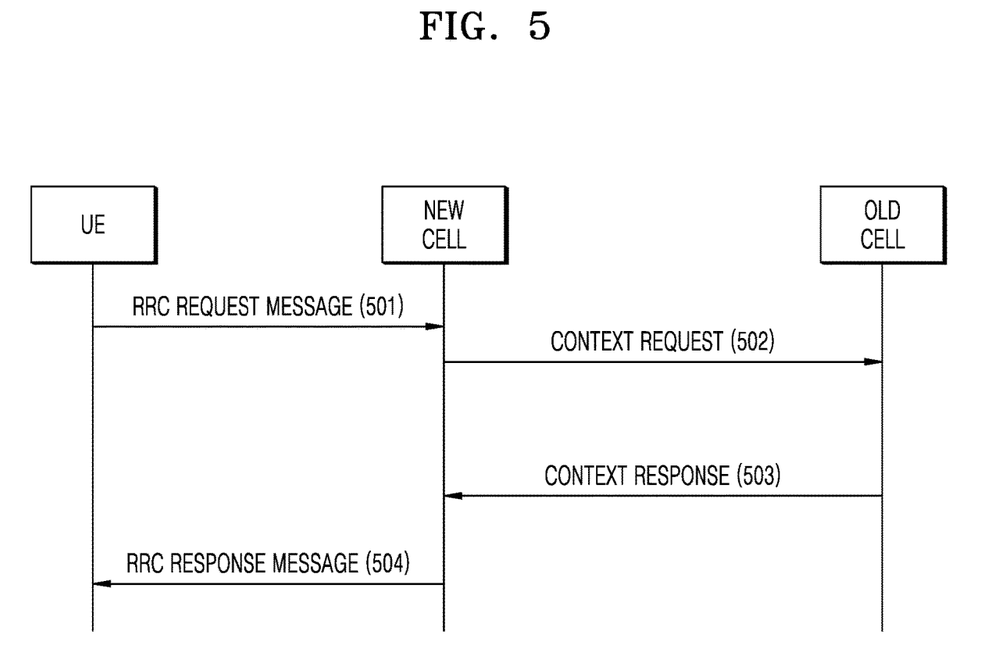
FIG. 5 is a schematic diagram of Embodiment 3 of the present invention.

FIG. 5 describes Embodiment 3 of the method of the present invention. A new cell is the cell where the UE performs RRC re-establishment, or the cell where the UE performs resume request. For example, UE is in an RRC Inactive state, and the UE initiates an RRC message in a cell to request to resume the context of the UE and to enter the RRC connection state. The new base station is a base station where the new cell locates, and old cell is a previous cell serving the UE, also referred as the previous service cell. The old base station is a base station where the old cell locates. The new base station and the old base station may be eNBs connected to the 5G core network, gNBs, or nodes supporting non-3GPP access technology.

Step 501, the new cell receives the RRC request message from the UE. The RRC message can be an RRC re-establishment request, a resume request, or a new message. The message carries the following information:

The identifier of the UE, which may be C-RNTI or access network identifier of the UE. This C-RNTI or access network identifier is allocated to UE from the previous service cell, i.e., the old cell.

The information of the previous service cell. It may include the identifier of the old base station, or part of information of the identifier of the old base station, and/or the physical layer identifier PCI of the old cell, and/or the unique identifier ECGI of the old cell.

The identifier of old service cell of the UE, which may be the PCI of the old cell or the unique identifier of the old cell.

Authentication token, such as ShortMAC-I; according to the saved information, UE calculates the authentication token of message, UE transmits the authentication token to the base station, and the base station can authenticate whether the UE and messages transmitted by the UE are legal, by using the authentication token transmitted by the UE. For example, the base station calculates an authentication token based on the information saved itself and then authenticates the authentication token received from UE with it. If the two are the same, the base station can determine that UE is a legal UE and the received message is a legal message. In this embodiment, the old base station performs the authentication.

Step 502, the new cell transmits the context request message of the UE to the old cell. The context request message of the UE includes the following information:

Information used for finding the old cell. It may include the identifier of the old base station, or part of information of the identifier of the old base station, and/or the physical layer identifier PCI of the old cell, and/or the unique identifier ECGI of the old cell.

Information used for finding the UE context. It may include the user identifier C-RNTI of the UE in the old cell, or part of information of C-RNTI.

Authentication token, for example, ShortMAC-I, which is the authentication token carried in the RRC message transmitted by the UE.

Physical layer identifier of the new cell or the unique identifier of the new cell.

Authentication indication information, indicating the RRC process initiated by the UE. For example, the authentication indication information indicates whether the RRC process initiated by the UE is RRC re-establishment or RRC resume request. Different processes correspond to different calculation methods of authentication token. Or, the indication information indicates different methods for calculating authentication token, for example, the indication information indicates the old cell to use which method to calculate ShortMAC-I, specifically, the old cell can adopt two user authentication methods:

Method 1: the authentication token is obtained according to the C-RNTI allocated by the source cell, the physical layer identifier PCI of the source cell, and the cell unique identifier of the target cell. The source cell is the previous service cell of UE, namely the old cell. The target cell is the cell where UE initiates RRC re-establishment or resume request, namely the new cell.

Method 2: the authentication token is calculated according to the C-RNTI allocated by the source cell, the physical layer identifier PCI of the source cell, the cell unique identifier of the target cell, and the constant. The source cell is the previous service cell of UE, namely the old cell. The target cell is the cell where UE initiates RRC re-establishment or resume request, namely the new cell.

Based on the indication information, the old cell decides which method is adopted to calculate the ShortMAC-I. Then, the old cell compares the calculated ShortMAC-I with ShortMAC-I transmitted by the UE. If they are same, the UE is deemed to have passed the authentication, and the UE context found is the UE context information requested by the new cell.

Step 503: the old cell transmits a UE context response message to the new cell. The message carries all the context information of the UE. The context information includes the capability of the UE, the key KeNB* used by the new cell, NCC, the carried information, and the like.

Step 504, the new cell transmits an RRC response message to the UE, to determines that the RRC re-establishment is successful.

The embodiment of present invention also provides a user equipment, including: a first receiving module, configured to receive a handover command or a radio resource control (RRC) message transmitted by a first base station; and a first transmitting module, configured to transmit an RRC re-establishment message to a second base station, wherein the RRC re-establishment message carries the authentication token information. The embodiment of present invention also provides a first base station device, including: a second transmitting module, configured to transmit a handover command or a radio resource control (RRC) message to the UE; a second receiving module, configured to receive a message for requesting UE context information transmitted by a second base station, wherein the message carries the authentication token information and authentication indication information; and an authentication module, configured to authenticate UE according to the authentication token information and authentication indication information; the second transmitting module further configured to transmit the UE context information to the second base station, when the UE is successfully authenticated by the first base station.

The embodiment of present invention also provides a second base station device, including: a third receiving module, configured to receive an RRC re-establishment message transmitted by the UE, wherein the RRC re-establishment message carries authentication token information; and a third transmitting module, configured to transmit a message for requesting the UE context information to a first base station, wherein the message carries the authentication token information and authentication indication information; a third receiving module further configured to receive the UE context information from the first base station.

The embodiment of present invention also provides a user equipment, including: a memory and a processor, wherein the memory stores computer executable instructions thereon, when the instructions are executed by the processor, the processor executes the above method embodiments.

The embodiment of present invention also provides a first base station device, including: a memory and a processor, wherein the memory stores computer executable instructions thereon, when the instructions are executed by the processor, the processor executes the above method embodiments.

The embodiment of present invention also provides a second base station device, including: a memory and a processor, wherein the memory stores computer executable instructions thereon, when the instructions are executed by the processor, the processor executes the above method embodiments.

Figure 6:
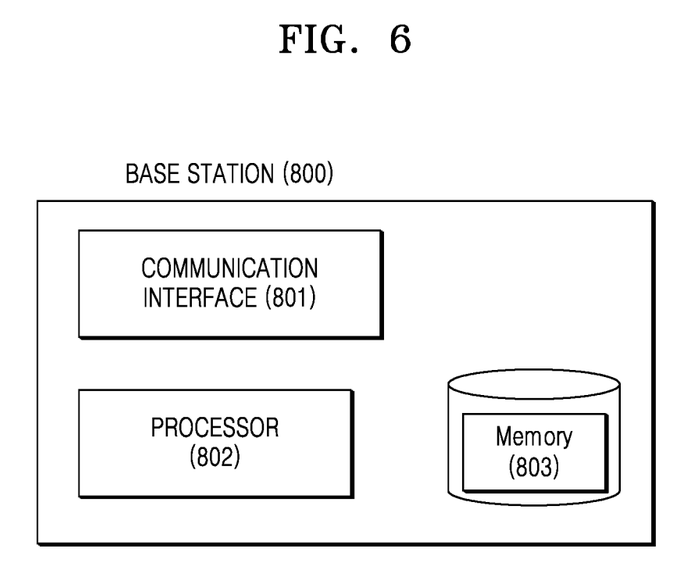
FIG. 6 is a schematic diagram of a device of the present invention.

FIG. 6 schematically shows a structural block diagram of a source base station or a target base station performing acquisition of a UE context, according to an exemplary embodiment of the present invention. As shown in FIG. 6, the source base station or the target base station includes: a communication interface 801 for external communication; a processing unit or processor 802, which may be a single unit or a combination of multiple units, for performing different steps of the method; a memory 803 having stored therein computer executable instructions that, when executed by the processor 802, causes the primary base station or the auxiliary base station to perform the embodiments of the present invention.

When the instructions are executed by the processor 802, if the base station shown in FIG. 6 is the source base station, the source base station 800 performs the following operations: obtaining of a request message for requesting a UE context, an identifier information of the message UE, and an authentication token by the communication interface 801; and finding of the UE context information from the memory 803 according to the identifier information of the UE.

The requested response information is transmitted from the target base station through the communication interface 801, which carries the UE context information.

Processor 802 can be a single Central Processing Unit (CPU), but can also include two or more processing units. For example, a processor can include a general purpose microprocessor, an instruction set processor, and/or a related chipset and/or a special purpose microprocessor (e.g., an Application Specific Integrated Circuit (ASIC)). The processor may also include an onboard memory for caching purposes. The computer program can be carried by a computer program product connected to the processor. The computer program product can include a computer readable medium having computer program stored thereon. For example, the computer program product can be flash memory, Random Access Memory (RAM), Read Only Memory (ROM), Electrically Erasable Programmable Read-Only Memory (EEPROM), and the computer program modules described above can be distributed to different computer program products in the form of memory within the UE in alternative embodiments.

The memory 803 stores information of a cell on the base station and the context information of UE served by the base station. The processor 802 receives the request message from the communication interface 801. The processor 802 queries the information saved by the memory 803 according to the information carried by the message, for example, the identifier of the UE, and finds the context information of the corresponding UE according to the identifier of the UE. Then the processor 802 performs the authentication, to determine that the UE is legal, and the processor 802 transmits the found UE context information to the base station which requests via the communication interface.

Figure 7:
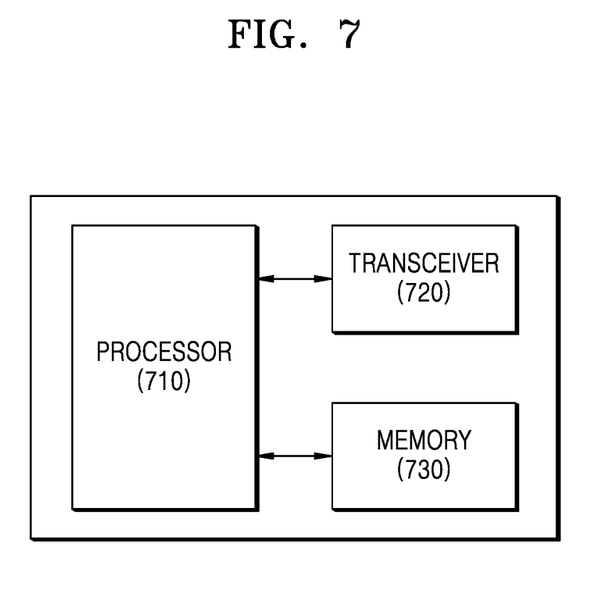
FIG. 7 is a block diagram illustrating the structure of a user equipment according to another embodiment of the present disclosure.

FIG. 7 is a block diagram illustrating the structure of a user equipment according to another embodiment of the present disclosure.

Referring to the FIG. 7, the user equipment 700 may include a processor 710, a transceiver 720 and a memory 730. However, all of the illustrated components are not essential. The user equipment 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the proposed function, process, and/or method. Operation of the user equipment 700 may be implemented by the processor 710.

The processor 710 may sense each configured resource pool and/or each group of resources to obtain a result of sensing, the result of sensing containing a set of remaining candidate single TU resources of each resource pool. The processor 710 may select, from the set of remaining candidate single TU resources of each resource pool and/or each group of resources, one candidate single TU resource as a transmission resource.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the device 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

The present disclosure has been described in connection with the preferred embodiments. It should be appreciated that various other changes, substitutions and additions may be made by those skilled in the art without departing from the spirit and scope of the disclosure. Therefore, the scope of the present disclosure is not limited to the specific embodiments described above, but is defined by the appended claims.

The above is only the preferred embodiment of the present invention, and is not intended to limit the present invention. Any modifications, equivalents, improvements, etc., which are made within the spirit and principles of the present invention, should be included in the scope of protection of the present invention.

What is claimed is:

1. A method performed by a user equipment (UE) in a wireless communication system, the method comprising:
    transmitting, to a second base station (BS), a request for a radio resource control (RRC) connection via a resume request message including a first authentication token or a re-establishment request message including a second authentication token,
    wherein the request for the RRC connection is associated with a UE context request message transmitted from the second BS to a first BS, the UE context request message including an authentication token and indication information indicating whether the RRC connection is requested to be resumed or re-established, wherein the authentication token is based on the indication information, and
    wherein the UE context request message is associated with a UE context request response message including a UE context, the UE context request response message being transmitted from the first BS to the second BS; and
    receiving, from the second BS, a response for the RRC connection, based on the UE context request response message.

2. The method of claim 1, wherein the authentication token includes the first authentication token, in case that the RRC connection is requested to be resumed, and
    wherein the authentication token includes the second authentication token, in case that the RRC connection is requested to be re-established.

3. The method of claim 2, wherein input variables used to generate the first authentication token are different from input variables used to generate the second authentication token.

4. The method of claim 2, wherein the second authentication token includes short message authentication code-integrity (ShortMAC-I).

5. The method of claim 1, wherein the UE context request message further includes information used for identifying the UE context.

6. The method of claim 5, wherein the information used for identifying the UE context includes a cell-radio network temporary identifier (C-RNTI) corresponding to the UE, the C-RNTI being included in the request for the RRC connection.

7. A user equipment (UE) in a wireless communication system, the UE comprising:
    a transceiver; and
    at least one processor coupled with the transceiver and configured to:
        transmit, to a second base station (BS) via the transceiver, a request for a radio resource control (RRC) connection via a resume request message including a first authentication token or a re-establishment request message including a second authentication token,
        wherein the request for the RRC connection is associated with a UE context request message transmitted from the second BS to a first BS, the UE context request message including an authentication token and indication information indicating whether the RRC connection is requested to be resumed or re-established, wherein the authentication token is based on the indication information, and
        wherein the UE context request message is associated with a UE context request response message including a UE context, the UE context request response message being transmitted from the first BS to the second BS; and
        receive, from the second BS via the transceiver, a response for the RRC connection, based on the UE context request response message.

8. The UE of claim 7, wherein the authentication token includes the first authentication token, in case that the RRC connection is requested to be resumed, and
    wherein the authentication token includes the second authentication token, in case that the RRC connection is requested to be re-established.

9. The UE of claim 8, wherein input variables used to generate the first authentication token are different from input variables used to generate the second authentication token.

10. The UE of claim 8, wherein the second authentication token includes short message authentication code-integrity, ShortMAC-I.

11. The UE of claim 7, wherein the UE context request message further includes information used for identifying the UE context.

12. The UE of claim 11, wherein the information used for identifying the UE context includes a cell-radio network temporary identifier (C-RNTI) corresponding to the UE, the C-RNTI being included in the request for the RRC connection.

\* \* \* \* \*